(12) United States Patent
Moyna

(10) Patent No.: US 6,672,822 B1
(45) Date of Patent: Jan. 6, 2004

(54) EJECTOR BODY AND METHOD USING A TILTABLE EJECTOR

(75) Inventor: John P Moyna, Elkader, IA (US)

(73) Assignee: Caterpillar S.A.R.L., Geneva ( * ) Notice: Subject to any disclaimer, the term of this patent is extended or adjusted under 35 U.S.C. 154(b) by 0 days.

(21) Appl. No.: 09/283,650

(22) Filed: Apr. 1, 1999

Related U.S. Application Data

(63) Continuation of application No. 08/936,280, filed on Sep. 24, 1997, now abandoned.

(51) Int. Cl.[7] .................................................. B60P 1/00
(52) U.S. Cl. ........................ 414/517; 414/492; 414/813
(58) Field of Search ............................... 414/509, 510, 414/511, 512, 513, 514, 515, 516, 517, 518, 585, 492, 493, 501, 521, 519, 520, 812, 813; 100/218, 295

(56) References Cited

U.S. PATENT DOCUMENTS

| | | | |
|---|---|---|---|
| 2,996,202 A | * 8/1961 | Neyland | ...................... 414/679 |
| 3,021,968 A | 2/1962 | Myers | |
| 3,247,984 A | 4/1966 | Gregory, Sr. et al. | |
| 3,465,458 A | * 9/1969 | Wagner | ................... 414/517 X |
| 3,672,520 A | * 6/1972 | Linville | ....................... 414/513 |
| 4,011,957 A | 3/1977 | Bendtsen | |
| 4,071,153 A | 1/1978 | Booher | |
| 4,775,283 A | * 10/1988 | Krapp et al. | ............ 414/517 X |
| 5,281,074 A | 1/1994 | Mashuda | ..................... 414/517 |
| 5,456,521 A | 10/1995 | Moyna | ........................ 298/1 B |

FOREIGN PATENT DOCUMENTS

| | | | |
|---|---|---|---|
| BE | 793803 | 2/1973 | |
| BE | 813211 | 7/1974 | |
| DE | 1111521 | 7/1961 | |
| EP | 0012227 A1 | 6/1980 | |
| FR | 1000609 | 3/1946 | |
| GB | 1136422 | 3/1966 | |
| GB | 2212131 | * 7/1989 | ................. 414/517 |

* cited by examiner

*Primary Examiner*—James W. Keenan
(74) *Attorney, Agent, or Firm*—John J. Cheek; James R. Smith

(57) ABSTRACT

An ejecting device for a dump truck has a truck bed with a bed surface, a pair of side walls, and a pivotally moveable tailgate. The ejecting device has a pair of guide rails, one each mounted to a top edge of the side walls of the bed. A generally vertically oriented ejector plate is disposed between the side walls extending transversely there across and has a roller member assembly attached to each side edge. The roller assemblies are carried one in each of the guide rails. The ejector plate is moveable between a fully retracted position at a first end of the truck bed to a fully extended position at a second end of the truck bed adjacent the tailgate. An extendable cylinder is carried on the truck frame and attached to the ejector plate for moving the plate between the fully retracted position and the fully extended position to eject material from the bed.

18 Claims, 6 Drawing Sheets

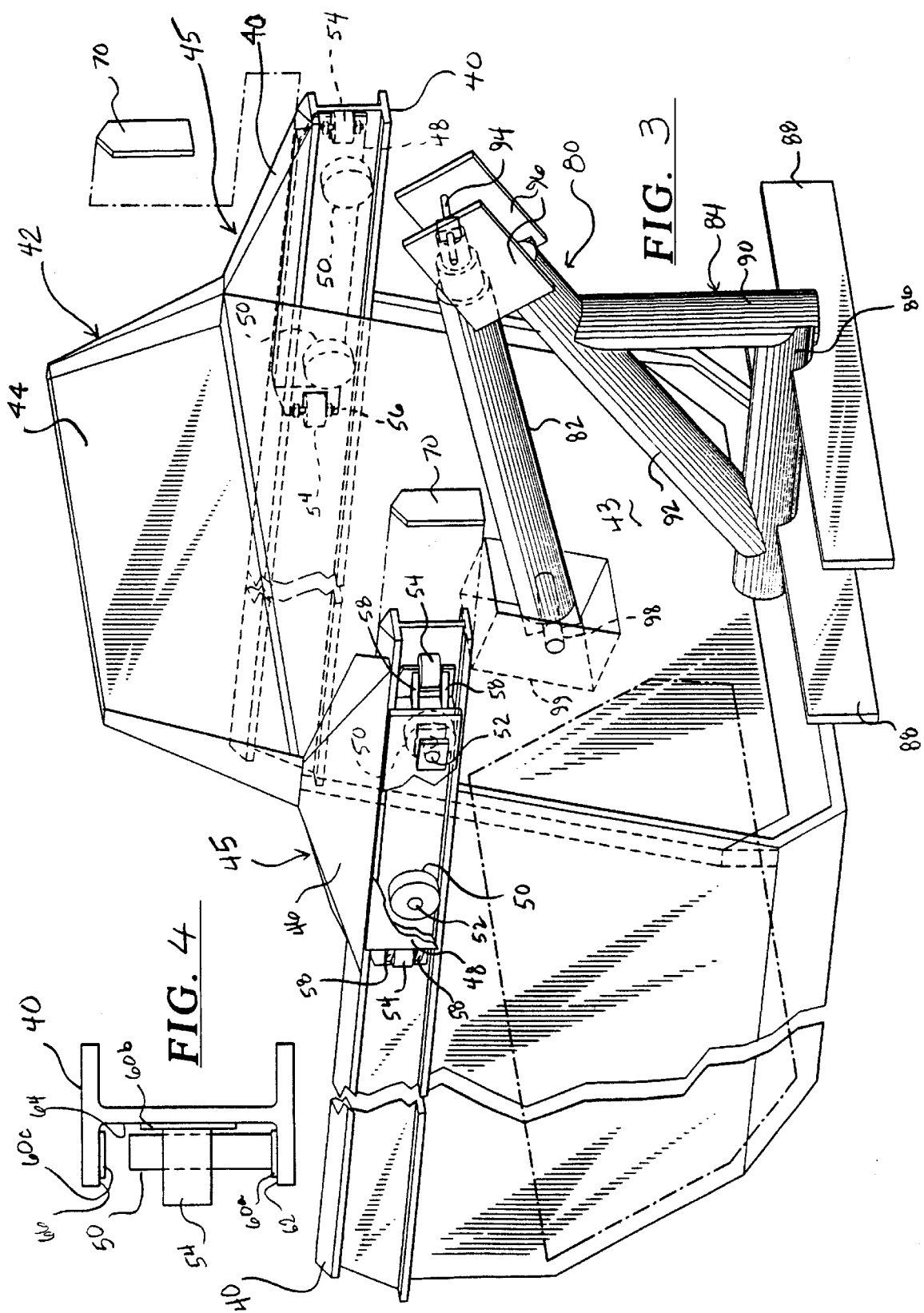

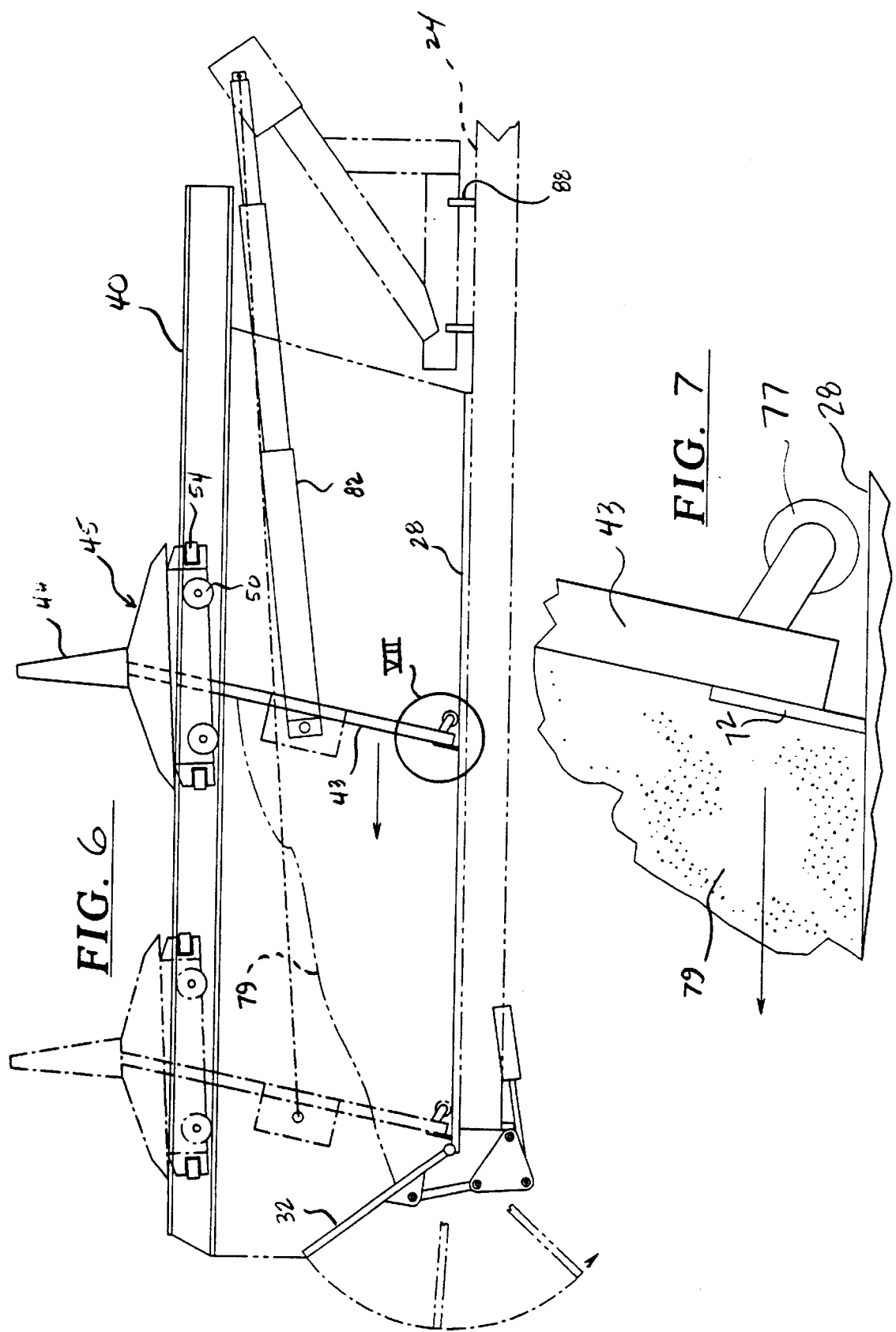

US 6,672,822 B1

EJECTOR BODY AND METHOD USING A TILTABLE EJECTOR

CROSS-REFERENCE TO RELATED APPLICATIONS

This is a continuation and claims the benefit under 35 U.S.C. §120 of prior co-pending patent application Ser. No. 08/936,280, filed on Sep. 24, 1997, now abandoned.

BACKGROUND OF THE INVENTION

The present invention relates to a device and method for unloading a load-carrying body and, more particularly, to a device and method having a tilting ejector movable within the body.

DESCRIPTION OF THE RELATED ART

Dump trucks have long been known in the art for use in carrying different types of loads. One such use is in the construction industry for carrying dirt or other material of relatively small material particle size in the dump truck bed. Such a material of small particle size has a tendency to stick to the bottom and sides of the dump truck bed, especially when wet, which prevents or hinders unloading of all of the material.

One solution has been to include plastic liners in the dump truck bed so that the material will slide from the bed as the material is dumped. However, such liners rapidly wear and some materials stick to such liners as easily as they stick to the bed surface. Examples of dump trucks are found in U.S. Pat. Nos. 1,927,653; 1,485,632; 4,145,824; 4,548,131; 3,880,072; 3,815,323; 2,179,726; 2,166,846; 3,739,715; 3,625,140; 4,467,712; 4,745,856; and German DE 2 152 881.

Additionally, U.S. Pat. No. 5,456,521, invented by the applicant of the present invention, discloses an unloading gate for a dump truck wherein the gate is mounted to one or more rails disposed on the bottom surface of the bed. The unloading gate moves from one end of the bed to the other to scrape and clean the bed after unloading or dumping of the material. The unloading gate in this patent may be utilized in conjunction with a conventional dump truck bed which lifts at its forward end closest to the tractor cab and utilizes gravity to dump the material from the dump truck bed. This patent is also limited in the amount of material that can be dumped due to the strength of the ejector mechanism implemented.

SUMMARY OF THE INVENTION

A need, therefore, exists for an improved ejector mechanism that overcomes the deficiencies of known aids used to assist in unloading of loads.

The present invention relates to an ejecting device for a truck which is mounted on side rails carried on the truck bed and eliminates the need for a conventional dump truck bed which lifts at one end and utilizes gravity to empty the contents of the truck bed.

In one embodiment, an ejecting device is disclosed for a truck having a frame carrying a truck bed. The bed has a bed surface, a pair of side walls, a first end, a second end, and a pivotally moveable tailgate on the second end. The ejecting device has a pair of elongate guide rails, one mounted along a top edge of each of the side walls. An ejector plate extends transversely between the side walls and has a lower edge adjacent the bed surface and a pair of side edges adjacent the side walls. A roller member assembly is attached to each of the side edges of the ejector plate and is slidable on the respective one of the pair of guide rails so that the ejector plate is moveable between a fully retracted position at the first end of the truck bed and a fully extended position at the second end of the truck bed adjacent the tailgate. At least one extendable cylinder is mounted on the truck and adapted to move the ejector plate between the fully retracted position and the fully extended position.

In one embodiment, the tailgate is moveable between a raised position when the ejector plate is in the fully retracted position and a lowered position when the ejector plate is in the fully extended position.

In one embodiment, the ejecting device has a tailgate which automatically moves to a raised position when the ejector plate is moved toward the fully retracted position and automatically moves to a lowered position when the ejector plate is moved towards the fully extended position.

In one embodiment, the ejecting device has an ejector plate with a scraping member adjustably secured to the lower edge.

In one embodiment, the ejecting device has an ejector plate with a lower edge adjacent the bed surface and one or more support wheels carried on the lower edge which ride along the bed surface.

In one embodiment, the guide rails each comprise an I-beam configuration in cross-section.

In one embodiment, guide rails each are integrally formed as part of one of the side walls of the bed.

In one embodiment, the ejecting device has a support bracket carried on each guide member assembly and a plurality of rollers on the support bracket, the rollers being adapted to ride along a respective one of the guide rails.

In one embodiment, the ejecting device has at least one vertical roller on each of the guide member assemblies adapted to vertically support and guide the ejector plate and at least one lateral roller adapted to laterally position and guide the ejector plate along the respective one of the guide rails.

In one embodiment, the ejecting device has one or more bearing surfaces on the guide rails adapted so that the guide member assemblies are slidable along the one or more bearing surfaces on the guide rails.

In one embodiment, the ejecting device has a support bracket carried by the frame and pivotally supporting one end of the extendable cylinder wherein the support bracket is centrally mounted relative to the frame and the extendable cylinder is centrally and pivotally attached to the ejector plate.

In one embodiment, the ejecting device has a pair of extendable cylinders, one each carried on one of the side walls below the respective one of the guide rails, one end of each of the extendable cylinders being attached to opposite sides of the ejector plate for moving the ejector plate between the retracted position and the extended position.

In one embodiment, a truck has a frame and a truck bed supported on the frame. The truck bed has a bed surface, a pair of side walls extending upward from the bed surface, a first end, a second end, and a pivotally movable tailgate on the second end. The bed has a pair of elongate guide rails, one mounted along a top edge of each of the side walls. An ejector plate extends transversely between the side walls and has a lower edge and a pair of side edges. A guide member assembly is attached to each of the side edges of the ejector plate and is slidable on the respective one of the pair of guide rails so that the ejector plate is movable between a fully retracted position at the first end of the truck bed and a fully extended position at the second end of the truck bed adjacent the tailgate. At least one extendable cylinder is mounted on the truck and adapted to move the ejector plate between the fully retracted position and the fully extended position.

In one embodiment, the truck has a scraping member adjustably secured to the lower edge of the ejector plate.

In one embodiment, the truck has an ejector plate having one or more support wheels carried on the lower edge which ride along the bed surface.

In one embodiment, the guide rails each have an I-beam configuration in cross-section.

In one embodiment, the truck has a support bracket on each guide member assembly and a plurality of rollers carried on the support bracket, the rollers adapted to ride along a respective one of the guide rails.

In one embodiment, the truck has at least one vertical roller on each guide member assembly adapted to vertically support and guide the ejector plate and at least one lateral roller adapted to laterally position and guide the ejector plate along the respective one of the guide rails.

In one embodiment, the truck has a support bracket carried by the frame and pivotally supporting one end of the extendable cylinder wherein the support bracket is centrally mounted relative to the frame and the extendable cylinder is centrally and pivotally attached to the ejector plate.

In one embodiment, the truck has a pair of extendable cylinders, one each carried on one of the side walls below the respective one of the guide rails, one end of each of the extendable cylinders attached to opposite sides of the ejector plate for moving the ejector plate between the retracted position and the extended position.

It is, therefore, an advantage of the present invention to provide an unloading or ejecting device for a truck bed which both empties the contents from the bed and moves or scrapes all of the material carried within the body during dumping.

Another advantage of the present invention is to provide a device which replaces a conventional dump truck bed that must be raised at one end to empty the contents from the bed.

Yet another advantage of the present invention is to provide a device that increases the amount of material that can be removed from a truck body.

Other objects, features and advantages of the invention will be readily apparent from the following description of certain preferred embodiments thereof taken in conjunction with the accompanying drawings. Variations and modifications may be effected without departing from the scope and spirit of the present invention and novel concepts of the disclosure as well.

BRIEF DESCRIPTION OF THE DRAWINGS

FIG. 3 illustrates a perspective view of an embodiment of a side rail ejecting device carried on a truck bed and constructed in accordance with one embodiment of the present invention.

FIG. 4 illustrates an end view of one of the side rails and a portion of a guide member of the side rail ejecting device of FIG. 3.

FIG. 5 illustrates a cross-sectional view taken generally along line V—V of FIG. 1 illustrating the bottom portion of the side rail ejecting device.

FIG. 6 illustrates a side view of the side rail ejecting device of FIG. 3 wherein an ejector plate is positioned in the middle of the bed as shown in solid line and at the rear end of the bed in a fully extended position as shown in dotted line.

FIG. 7 illustrates an enlarged view taken from circle VII of FIG. 6 of the bottom portion of the ejector plate.

DETAILED DESCRIPTION OF THE PRESENTLY PREFERRED EMBODIMENTS

Figure 1:
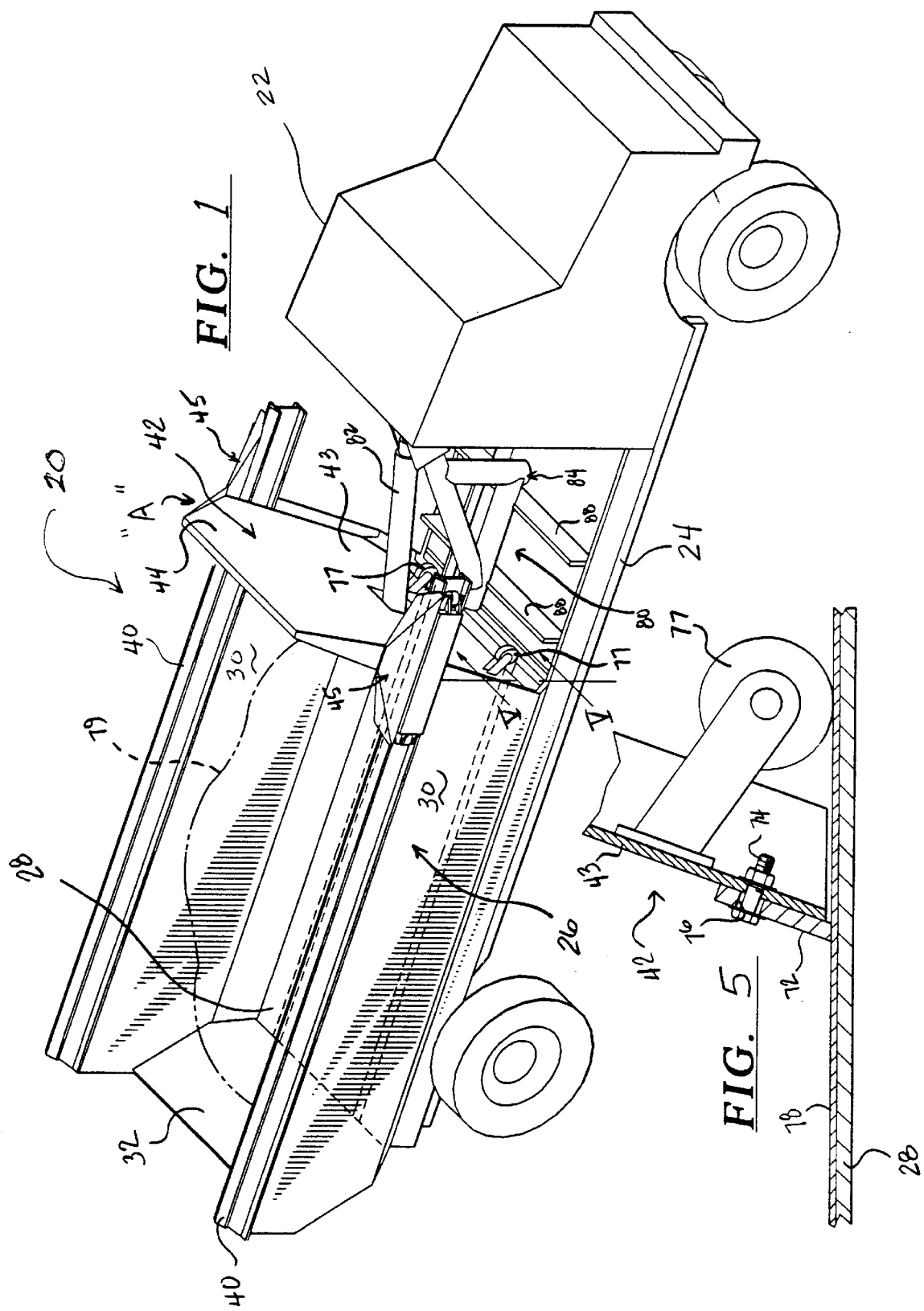
FIG. 1 illustrates an elevational perspective view of a truck onto which an embodiment of an ejecting device of the present invention is mounted.

FIG. 1 illustrates a dump truck 20 which has a conventional tractor or cab portion 22 and a rear frame 24 upon which a truck bed 26 is carried. The bed 26 of the present invention is different from a conventional dump truck in that the bed does not pivot about one end and raise at the other, but instead remains relatively horizontal and positioned on the frame 24 of the dump truck 20.

Figure 2:
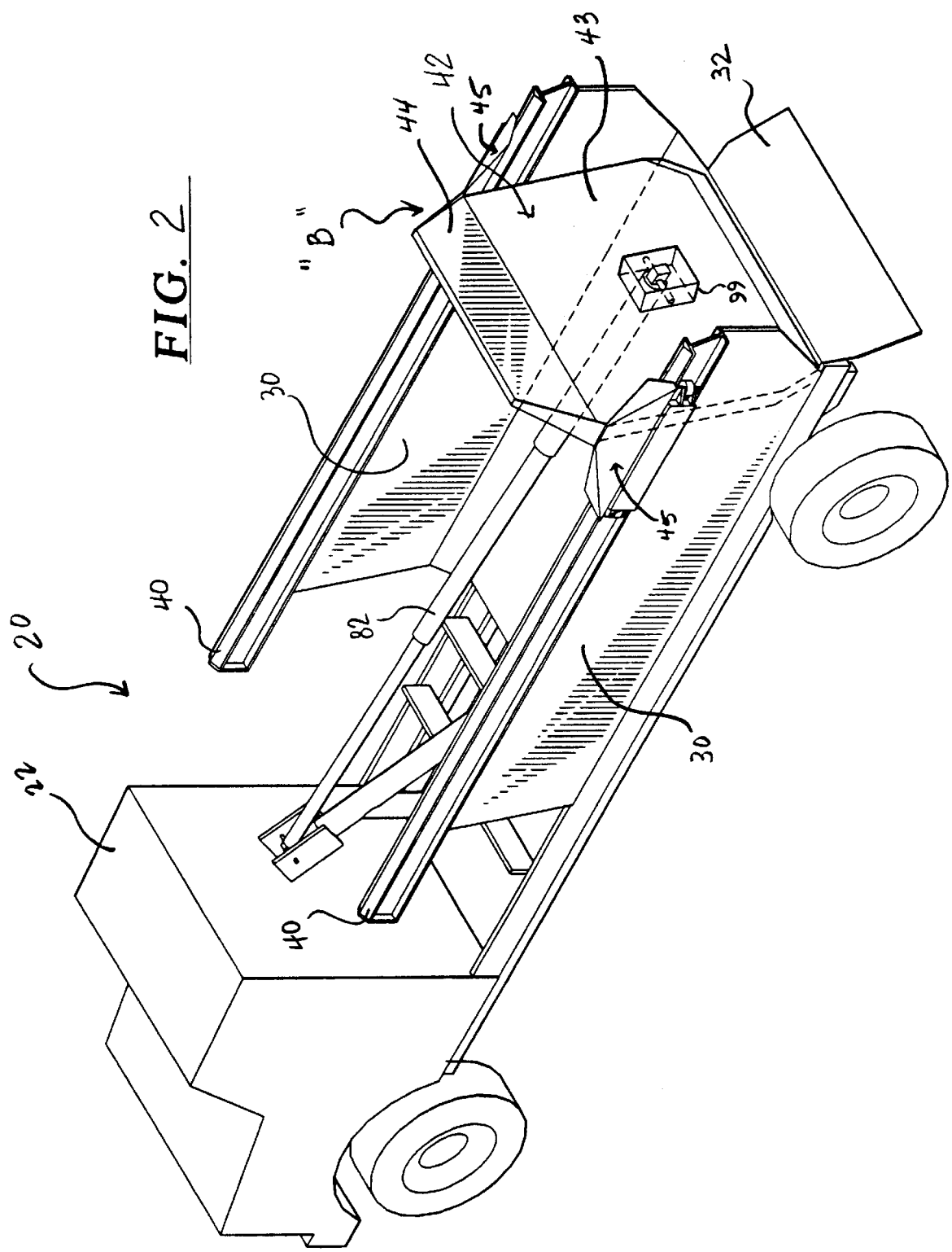
FIG. 2 illustrates a perspective view of an embodiment of the truck of FIG. 1 wherein the ejecting device is fully extended to the rear end of the truck bed.

As illustrated in FIGS. 1 and 2, the bed 26 of the dump truck 20 includes a bottom wall or bed surface 28 and a pair of generally upright, spaced apart and generally parallel side walls 30. The bed 26 also includes a pivotable tailgate 32 attached at its rearward end. The tailgate 32 is pivotable at its bottom end along a rear edge of the bed surface 28. The tailgate 32 will be discussed in more detail below in describing the function of the ejecting device of the invention.

FIGS. 3 and 4 illustrate a pair of guide rails 40, one each carried on the top edge of the side walls 30 of the bed 26. The guide rails 40 are each of an I-beam is configuration as best illustrated in FIG. 4 and are preferably constructed of an extremely sturdy, rigid and durable material such as steel or the like. The guide rails 40 may be integrally formed as a part of the side walls 30, or be separate components welded, bolted or otherwise adequately secured to the bed.

A moveable ejector plate 42 is received within the bed 26 and is slidably movable along the guide rails 40. The ejector plate 42 includes a generally vertical wall portion 43 which extends essentially the entire width of the truck body 26 and extends from the bottom bed 28 to, preferably, a height taller than the side walls 30. The outer periphery of the ejector plate 42 is of a contour matching that of the interior-cross-section of the bed 26. An upper portion 44 of the wall portion 43 is preferably tilted slightly rearward as shown in FIG. 6 to assist in pushing material toward the rear of the bed 26 and preventing material from spilling over the top of the upper portion 44.

The ejector plate 42 also includes a pair of guide member assemblies 45 extending from each side and attached to the ejector plate by brackets 46 which are either welded, bolted, or otherwise suitably attached to the vertical wall portion 43.

A depending roller support bracket 48 extends downwardly from each bracket 46 for carrying a plurality of guide rollers thereon. Each support bracket 48 carries a pair of vertical rollers 50 supported on horizontal axes 52 and are rotatable thereabout. The vertical rollers 50 support the ejector plate 42 vertically relative to the truck bed 26. Each support bracket 48 also carries on its opposite ends a pair of lateral rollers 54 rotatably supported on vertical axes 56.

The lateral rollers 54 are carried between parallel struts 58 affixed to the support bracket 48. The struts 58 are preferably welded or otherwise securely mounted to the support brackets 48. The lateral rollers 54 provide lateral positioning and guidance for the ejector plate 42. The vertical rollers 50 and the lateral rollers 54 are preferably free to rotate about their respective axes and, therefore, are mounted with low friction and high durability roller bearing assemblies.

To further enhance the wear characteristics and reduce the friction of movement of the ejector plate 42, each guide rail 40 carries a bearing surface 60a, 60b and 60c on each surface against which the rollers 50 and 54 ride. As shown in FIG. 4, the bearing surface 60a may be disposed on a lower surface 62 of each guide rail against which the vertical rollers 50 typically ride. The bearing surface 60a therefore must exhibit characteristics of a relatively lower coefficient of friction and extremely high durability since this bearing surface supports the weight of the ejector plate 42 and at times an increased load as described below. The bearing surface 60b is disposed on the vertical surface 64 of each guide rail 40 against which the lateral rollers 54 ride. The bearing surface 60b, therefore, must provide a wear resistant, durable surface having low coefficient of friction characteristics as well. The bearing surface 60c is disposed on the upper guide rail surface 66 and must be durable to protect the guide rail material when the forward vertical rollers 50 are lifted upwards, as described below, as the ejector plate 42 moves rearward during unloading.

A pair of end plates 70 are attached one each to the forward ends of the guide rails 40 nearest the truck cab 22 to prevent the guide member assemblies 45 from extending beyond ends of the guide rails 40. The end plates 70 may be welded, bolted or otherwise secured to the guide rails 40 as desired.

FIG. 5 illustrates the lower end of the ejector plate 42 partially in cross-section. Attached to the bottom edge of the vertical wall portion 44 is a scraping member or scraper 72 which rides against the bed surface 28 to assist in ejecting all of the material from within the truck bed. The scraper 72 is preferably removably attached to the vertical wall portion 44 and, in the present embodiment, is secured by two or more bolts 74 received through openings along a bottom edge of the wall portion. The scraper 72 also includes a plurality of corresponding slotted openings 76 through which the bolts 74 are inserted. The slotted openings 76 permit vertical adjustment of the scraper 72 to accommodate for wear of both the scraper 72 and the bed surface 28.

As shown in FIGS. 5 and 7, one or more support wheels 77 may be carried on the bottom edge of the wall portion 44. The wheels 77 are preferably adapted to ride along the bed surface 28 as the ejector plate 42 moves along the bed 26 under no-load conditions. The wheel 77 is also preferably disposed so that the scraper 72 just touches the bed surface 28 under no-load conditions so that the wheel 77 and the vertical wheels 50 bear the brunt of the weight of the ejector plate 42.

Also as illustrated in FIG. 5, the bed surface 28 of the truck bed 26 may include a liner material 78 for protecting the bed and also for providing a surface which more readily releases material carried within the bed. As will be evident to those skilled in the art, the liner material 78 may be selected to accommodate a particular substance 79 for which the truck 20 may be utilized as some materials may stick to certain bed liner materials and not others.

Also as illustrated in FIGS. 1, 2 and 3, the ejecting device of the invention includes a pivotable and extendable drive mechanism 80 for moving the ejector plate 42 from a fully retracted position "A" illustrated in FIG. 1 to a fully extended position "B" illustrated in FIG. 2. The drive mechanism 80 includes an extendable cylinder 82 which is preferably a hydraulic telescoping cylinder as is generally known in the art to move and withstand heavy loads. The drive mechanism 80 also includes a sturdy support bracket 84 which in the present embodiment includes a horizontally oriented steel tubular member 86 securely supported on a pair of transverse frame members 88 carried on and extending across the truck frame 24. The bracket assembly 84 also includes a vertically oriented steel tubular member 90 welded to one end of the horizontal member 86 and an angled member 92 extending from the other end of the horizontal member 86 up to and beyond the top of the vertically oriented member 90. The angled member 92 is securely welded to both of the members 86 and 90 and extends to a free end 93 beyond the top edge of the vertical member 90.

Figure 11:
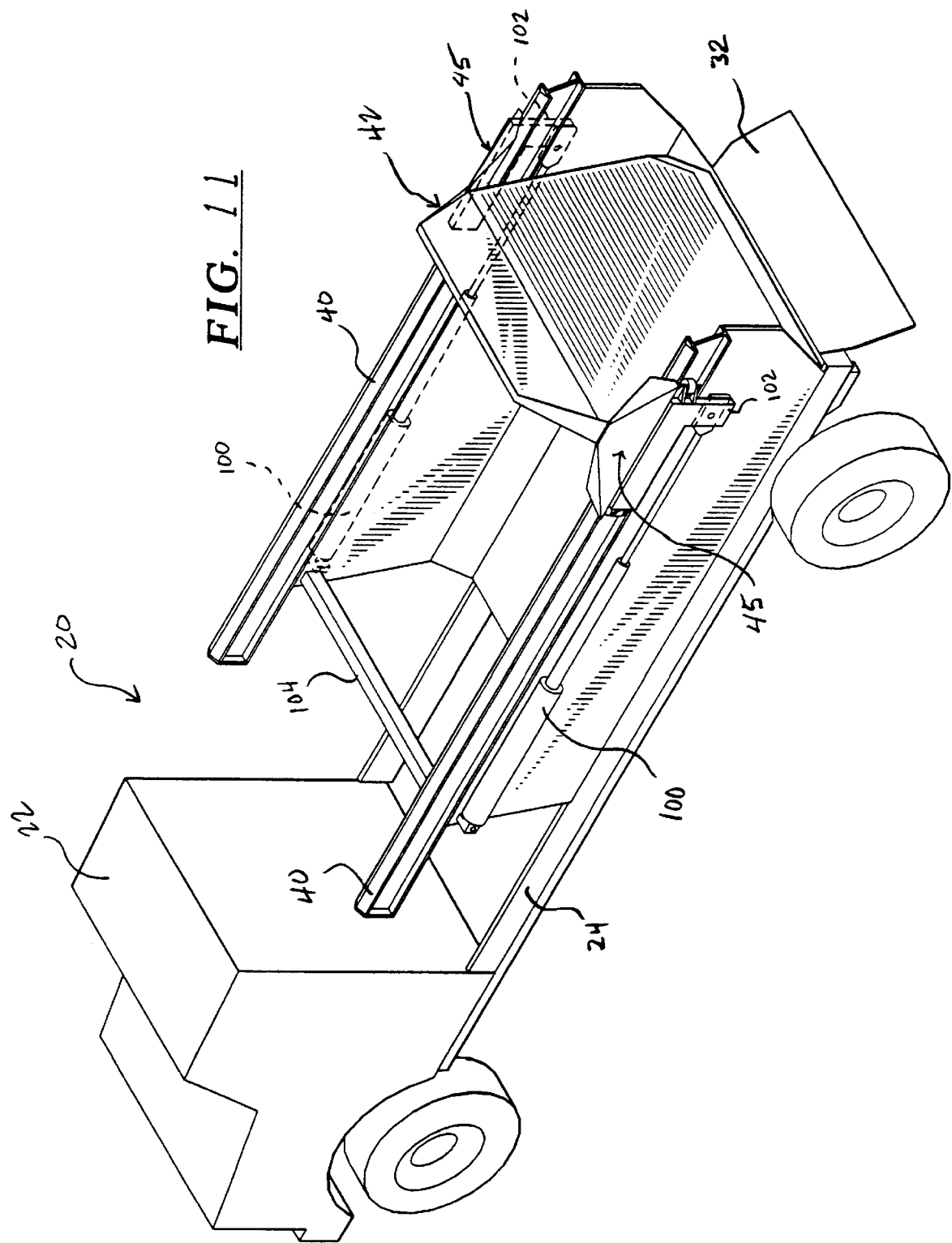
FIG. 11 illustrates a perspective view of a truck incorporating an embodiment of a side rail ejecting device constructed in accordance with another embodiment of the present invention.

The telescoping cylinder 82 may be pivotally carried at one end on a trunnion or pin 94 supported between a pair of support brackets 96 securely attached to the free end 93 of the angled member 92. The extendable cylinder 82 may be similarly attached at its opposite end to a trunnion or pin 98 supported by a bracket assembly 99 or the ejector plate 42. As will be evident to those skilled in the art, the particular construction of the drive member 80 may vary without departing from the scope of the present invention. FIG. 11, described below, illustrates one such alternative embodiment. The cylinder 82 should remain fairly horizontal and generally perpendicular to the ejector plate 42 to efficiently apply the load when moving the ejector plate 42.

During operation of the ejecting device, the telescoping cylinder 82 extends to move the ejector plate 42 from the retracted position "A" to the extended position "B". As will be evident to those in the art, as the cylinder 82 pushes the ejector plate 42 forward, significant resistence may be applied against the ejector plate 42. Particularly, the resistance is along its bottom edge causing the ejector plate 42 to tilt forward. As the ejector plate 42 tilts forward, the wheel 77 lifts from and the scraping member 72 is pressed against the bed surface 28 to efficiently scrape all of the material from the bed surface 28 during movement of the ejector plate 42 towards the tailgate 32 as illustrated in FIGS. 6 and 7.

Also as illustrated in FIG. 6, the roller guide member assemblies 45 are preferably fixedly attached to the ejector plate 42 and tilt in conjunction with the ejector plate 42. Thus, the leading vertical roller 50 may be forced downward increasing the load against the lower bearing surface 60a of the guide rail 40. The trailing vertical roller 50 lifts upward and may be forced against the bearing surface 60c carried on the upper surface 66 of the guide rail 40. The height of the guide rail 40 and the distance between the lower and upper surfaces 62 and 66, respectively, limits the amount of tilt of the ejector plate 42. The configuration may be designed and constructed to eliminate tilt of the device if desired.

Figure 8:
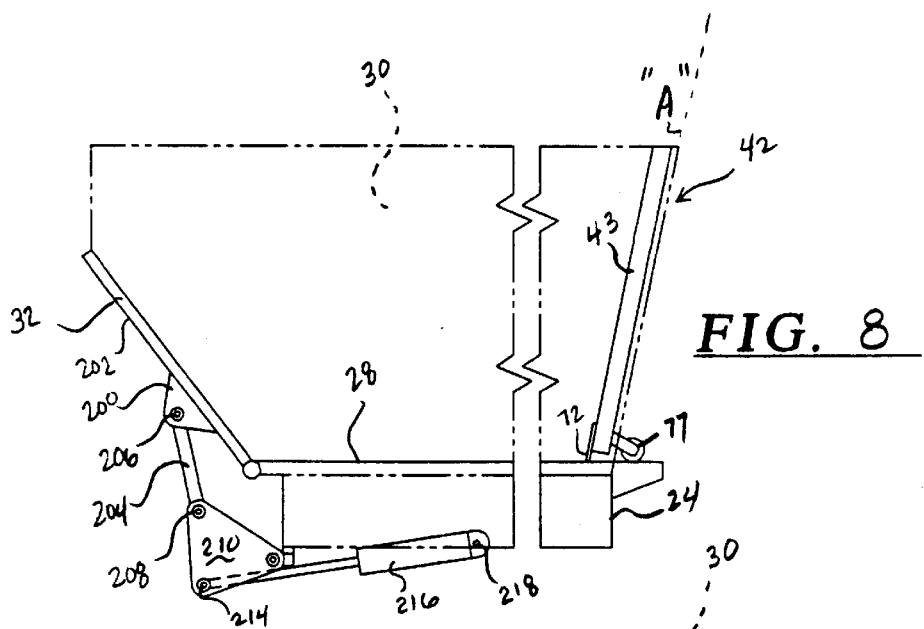
FIG. 8 illustrates a side view of an embodiment of a tailgate of the truck bed of FIG. 3 in its fully upright position.
Figure 9:
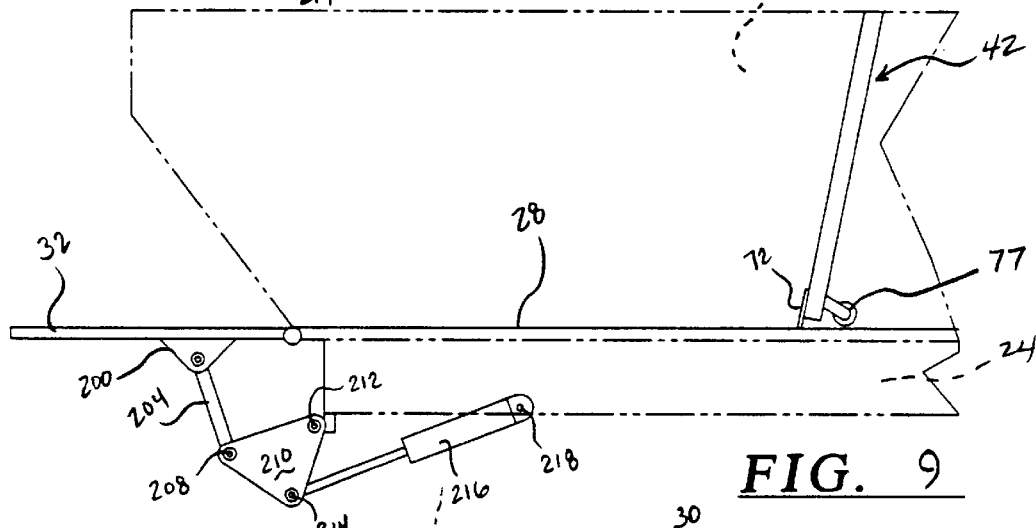
FIG. 9 illustrates a side view of an embodiment of a tailgate in a horizontal position with the ejector plate partly extended toward the rear end of the bed.
Figure 10:
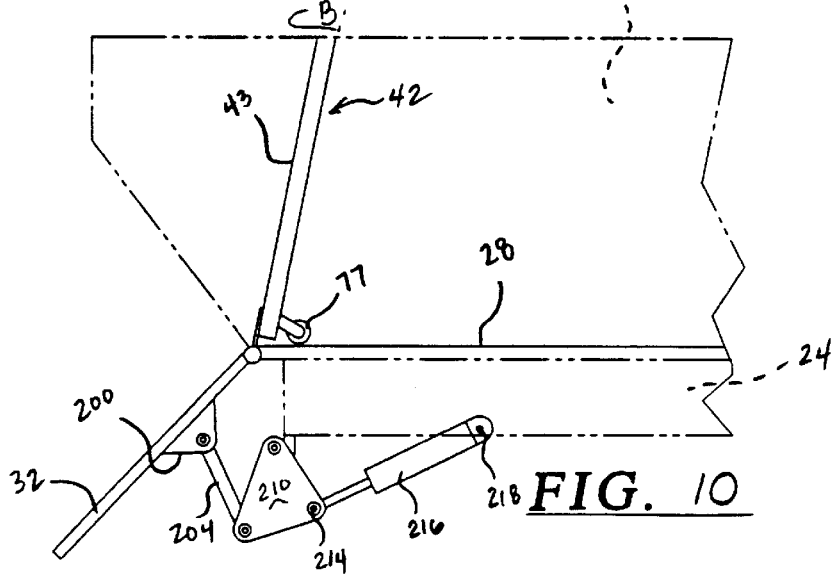
FIG. 10 illustrates a side view of an embodiment of a tailgate in a fully lowered position with the ejector plate in a fully extended position.

In one preferred embodiment of the invention, the tailgate 32 automatically lowers as the ejector plate 42 is moved to the fully extended position "B". In FIG. 8, the tailgate 32 is illustrated in its fully upright position prior to movement of the ejector plate 42. FIG. 9 illustrates that, in one embodiment, the tailgate 32 drops to a horizontal position parallel to the bed surface 28 permitting material carried within the truck bed 26 to easily flow from the bed. FIG. 10 illustrates that, in one embodiment, the tailgate 32 drops below horizontal as the ejector plate 42 reaches its fully extended position thus assisting in ejecting all of the material from the truck bed 26 utilizing gravity to draw the remaining material from the bed 26.

It is preferred that the tailgate 32 is not in a fully upright position or a 90° orientation relative to the bed surface when the ejector plate 42 is in the fully retracted position "A". Preferably, the tailgate 32 is tilted somewhat rearward and in one embodiment is about 30° relative to the plane of the bed surface 28 to assist in permitting the material held within the truck bed 26 to flow easily toward the tailgate 32 once the ejector plate 42 begins to move. It is also preferred that when the ejector plate 42 is in the fully extended position, the tailgate 32 is lowered to an angle beyond 45° and, in one embodiment, to about 50° relative to the plane of the bed surface 28 in order to eject all of the material from the truck bed 26.

As discussed above, the mechanism for moving the ejector plate 32 from the fully retracted position "A" to the fully extended position "B" may take on other configurations and constructions than that disclosed in the previously described embodiments. FIG. 11 illustrates one alternative embodiment which accomplishes the features and advantages of the invention. In this embodiment, the truck 20 includes a similar truck bed 26 having guide rails 40 mounted atop the vertical side walls 30. Below each of the guide rails 40 is telescoping extendable cylinder 100, each of which is similar in construction to the extendable cylinder 82 as previously described. One end of each cylinder 100 is fixedly attached to the truck bed 26 near the forward end adjacent the tractor cab 22. The opposite end of each cylinder 100 is attached to a bracket member 102 depending from the roller guide assemblies 44. This embodiment provides a more stable load applied to the ejector plate 42 in that each side of the plate 42 is supported to distribute the load.

Also, as illustrated in FIG. 11, the truck bed 26 may include a transverse beam 104 across the forward end between the side walls 30 to provide additional stability to the bed 26 during operation of the ejecting device of the invention.

In related commonly assigned co-pending application Ser. No. 08/936/128, entitled "TAILGATE LATCHING MECHANISM" filed concurrently with the present application, a particular mechanism is described for moving the tailgate 32 in conjunction with the previously described movement of the ejector plate 42. FIGS. 8–10 illustrate generally the apparatus which accomplishes movement of the tailgate 32.

The tailgate 32 includes a pair of projecting brackets 200 extending from and affixed to the exterior surface 202 for supporting one end of a rigid link 204 at a rotatable first pivot 206. The opposite end of the link 204 may be pivotally attached at a second pivot 208 to a coupling member 210 which, in one embodiment, may be triangular in shape. One corner of the coupling member 210 is connected to the link 204 at a second pivot 208. A second corner of the coupling member may be affixed to the underside of the truck bed 26 or frame 24 at a pivot 212 about which the coupling member 210 rotates. The other corner of the coupling member 210 includes a third pivot 214 rotatably connected to one end of an extendable cylinder 216. The opposite end of the extendable cylinder 216 is affixed at an additional pivot again to the under side of the bed 26 or frame 24 at a pivot 218.

As the cylinder 216 extends and retracts, it moves the third pivot 214 forward and rearward, respectively, thus moving the corner of the coupling member 210 and pivoting the member 210 about its own pivot 212. The rotation of the coupling member 210 is defined by the link length or distance between the pivot 212 and the pivot 214 and also the distance between the pivot 212 and the fixed pivot 218 of the cylinder 216. The distance between the pivot point 212 of the coupling member 210 and the first pivot 208 and also the length of the link 204 defines the rotation of the tailgate 32 relative to rotation of the coupling member 210. The coupling member 210, in essence, acts as a bell crank in manipulating the tailgate 32. Preferably, a pair of each of these components and linkages are implemented, one each on each side of the tailgate 32.

As is described in more detail in the co-pending U.S. patent application Ser. No. 08/936/128, the extendable cylinder 216 may move in conjunction with movement of the ejector plate 42. This may be accomplished mechanically via additional link and pivot mechanisms or may be accomplished electronically or a combination of the two. However, as the ejector plate 42 moves toward its fully extended position near the tailgate 32, the extendable cylinder 216 retracts drawing the coupling member 210 downward lowering the tailgate 32. As will be evident to those skilled in the art, coordination of movement between the tailgate 32 and the ejector plate 42 may be accomplished in a number of different manners without departing from the scope of the present invention, and further the present invention is not to be limited to such a construction of the tailgate.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A load-carrying body for use with a mobile work machine, comprising:

first and second opposed side walls;

a floor joining said side walls;

a movable ejector interposed between said side walls and having a lower margin adjacent said floor and an upper margin, said side walls, said floor, and said ejector together defining a load cavity open at an end thereof;

an ejector actuator connected with said ejector for moving said ejector toward said open end to eject load material from said cavity through said open end, movement of said ejector against said load material causing said ejector to tilt at its upper margin toward said open end to press the lower margin of said ejector against the floor of said body.

2. The load-carrying body of claim 1 wherein tilting of said ejector to press the lower margin of said ejector against the floor causes said ejector to scrape load material from the floor.

3. The body of claim 2 wherein said ejector actuator comprises an extendible hydraulic cylinder.

4. The body of claim 2 wherein said ejector actuator comprises means for moving said ejector relative to said side walls and said floor.

5. The body of claim 4 wherein said moving means comprises an extendible hydraulic cylinder.

6. The body of claim 2 wherein said body is carried horizontally on said work machine and remains horizontal during movement of said ejector.

7. The body of claim 1 wherein said ejector actuator comprises an extendible hydraulic cylinder.

8. The body of claim 1 wherein said ejector actuator comprises means for moving said ejector relative to said side walls and said floor.

9. The body of claim 8 wherein said moving means comprises an extendible hydraulic cylinder.

10. The body of claim 1 wherein said body is carried horizontally on said work machine and remains horizontal during movement of said ejector.

11. A method for ejecting load material from a load-carrying body having a floor joining opposed side walls, comprising:
providing an ejector interposed between the side walls and having a lower margin adjacent the floor and an upper margin, said ejector and the floor and side walls together defining a load cavity having an open end, said ejector being movable relative to said side walls and said floor by an ejector drive mechanism;
operating said ejector drive mechanism to move said ejector toward the open end of the load cavity to eject load material from the load cavity through the open end; and
causing said ejector, as it moves against the load material, to tilt at its upper margin toward said open end to press the lower margin of said ejector against the floor.

12. The method of claim 11 wherein the step of causing said ejector to tilt in its direction motion to press the lower margin of said ejector against the floor causes said ejector to scrape load material from the floor.

13. The method of claim 11 wherein said body is mounted horizontally on a mobile work machine and remains horizontal during movement of said ejector.

14. A ground-driven mobile work machine, comprising:
a frame assembly;
a ground-engaging drive mechanism mounted to said frame assembly; and
a load-carrying body in accordance with claim 1 mounted to said frame.

15. The mobile work machine of claim 14 wherein tilting of said ejector to press the lower margin of said ejector against the floor causes said ejector to scrape load material from the floor.

16. The work machine of claim 14 further comprising an ejector actuator connected with said ejector for moving said ejector relative to said side walls and said floor.

17. The work machine of claim 14 further comprising means for moving said ejector relative to said side walls and said floor.

18. The work machine of claim 14 wherein said body is mounted horizontally on said frame and remains horizontal during movement of said ejector.

* * * * *